Sept. 24, 1963   E. MAIER   3,104,811
MANUALLY OR MOTOR OPERABLE MINIATURE CALCULATOR
Filed March 9, 1959   8 Sheets-Sheet 1

Inventor:
Elmar Maier

Sept. 24, 1963            E. MAIER            3,104,811
MANUALLY OR MOTOR OPERABLE MINIATURE CALCULATOR
Filed March 9, 1959            8 Sheets-Sheet 2
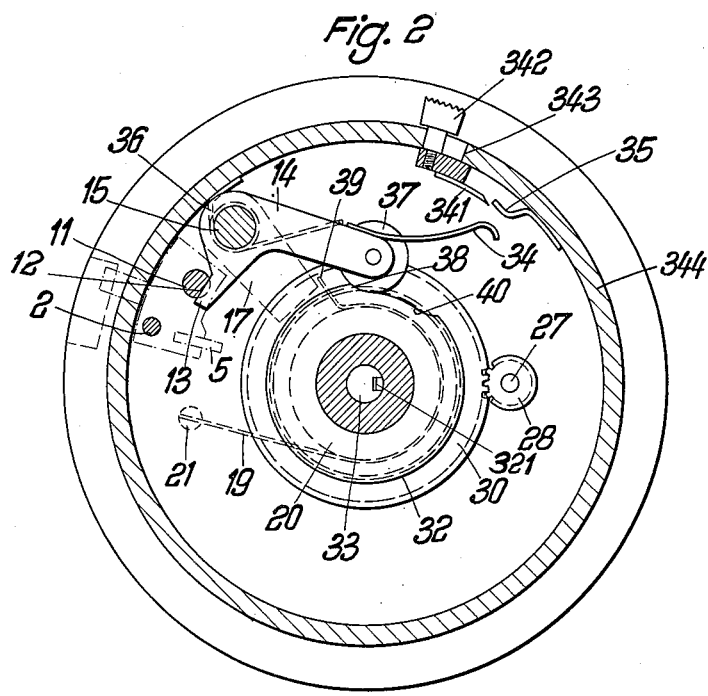
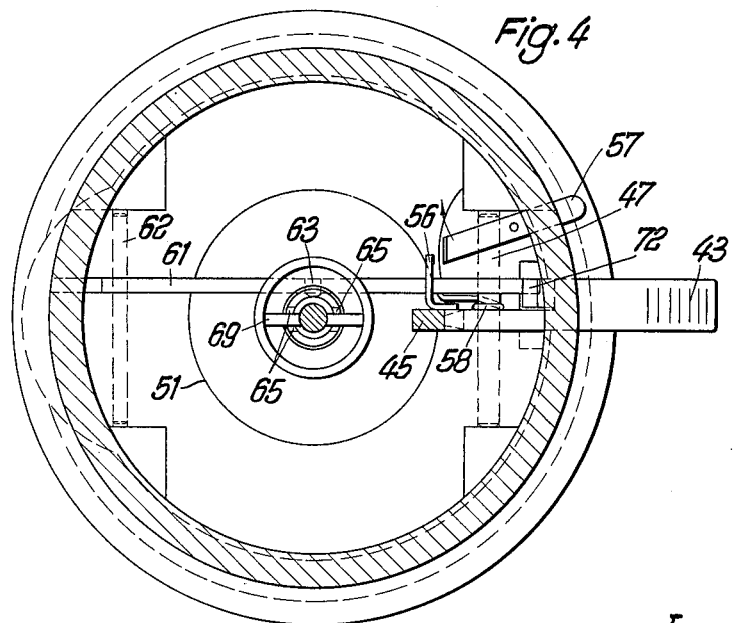
Inventor:
Elmar Maier Sept. 24, 1963 E. MAIER 3,104,811
MANUALLY OR MOTOR OPERABLE MINIATURE CALCULATOR
Filed March 9, 1959 8 Sheets-Sheet 3

Inventor:
Elmar Maier

Inventor:
Elmar Maier

Sept. 24, 1963   E. MAIER   3,104,811
MANUALLY OR MOTOR OPERABLE MINIATURE CALCULATOR
Filed March 9, 1959   8 Sheets-Sheet 6

Inventor:
Elmar Maier

Sept. 24, 1963            E. MAIER            3,104,811

MANUALLY OR MOTOR OPERABLE MINIATURE CALCULATOR

Filed March 9, 1959            8 Sheets-Sheet 7

Inventor:
Elmar Maier

Sept. 24, 1963 E. MAIER 3,104,811
MANUALLY OR MOTOR OPERABLE MINIATURE CALCULATOR
Filed March 9, 1959 8 Sheets-Sheet 8
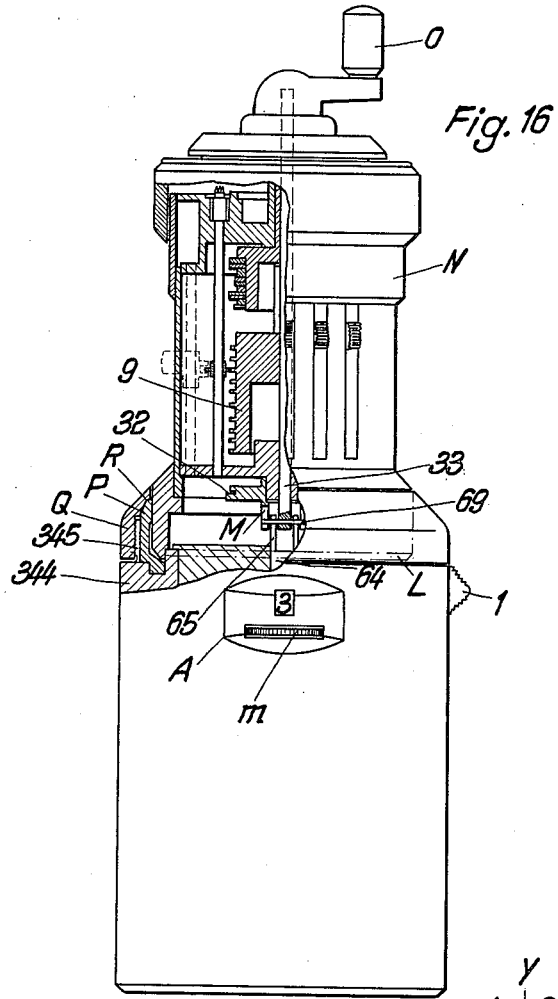
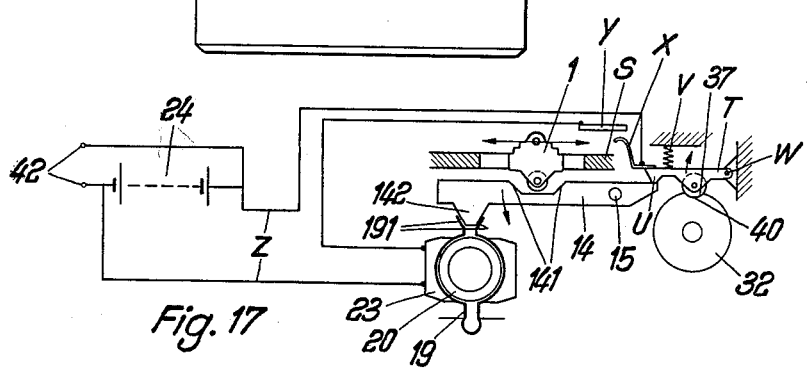
Inventor:
Elmar Maier

United States Patent Office 3,104,811
Patented Sept. 24, 1963

3,104,811
MANUALLY OR MOTOR OPERABLE MINIATURE CALCULATOR
Elmar Maier, Feldkirch, Austria, assignor to Contina Bureaux und Rechenmaschinenfabrik Aktiengesellschaft, Mauren, Liechtenstein
Filed Mar. 9, 1959, Ser. No. 798,119
Claims priority, application Austria Apr. 8, 1958
17 Claims. (Cl. 235—62)

Manually operable circular calculating machines are known which comprise a manually operated actuated shaft, calculator means, and a barrel slidable on the actuator shaft between a subtraction position and an addition position, and controlling the calculator means when the actuator shaft is turned.

The present invention is based on the recognition that it is also desirable to drive such manually operable circular calculating machines by a motor, particularly electrically.

The invention affords the advantage that the calculating machine can be driven either by hand or by a motor and that nevertheless the manual and motor drives are freely accessible from all sides.

The present invention is based on the additonal recognition that further problems arise in the case of such an electric drive of the calculating machine and that such problems must be solved if the motor drive of the calculating machine is to be successfully applied.

In order to solve these problems, means are provided which cause the electric motor to be operable only in the zero position of the barrel and calculator means. Further, a brake arrangement for rotary drive members is provided and operated to automatically set the barrel to the zero position immediately after the operation of a manual switch for the electric motor. The electric drive is adapted to be connected to the mainshaft of the calculating machine by a coupling which automatically assumes its engaged position during a rotation of the motor whereas it assumes a disengaged position during a manual operation. A single manual switch effects all control movements required for the operation of the calculating machine, such as shifting to addition or subtraction, release of the means which retain the barrel in its zero position, lifting of the brake and closing of the contacts, in the required sequence.

A satisfactory construction may be obtained in a number of ways. For instance, the drive motor, power source, switching and transmitting means may be accommodated in a unit which can be attached, preferably axially, to the calculating machine body and is portable together with the calculating machine body. Such a construction of the calculating machine has the advantage that where the power source consists of a storage battery the compact design by which such circular calculating machines distinguish and which enables them to be accommodated, e.g., in a brief case or even in the pocket of a garment, is retained whereas such storage batteries can be charged by a temporary connection of the appliance to an electrical supply system to ensure a permanent readiness of the electric drive for operation. For this reason these parts may either be constantly connected to the calculating machine or may consist of attachments or supplements (assembly of prefabricated parts), in which case they can be connected to or detached from the calculating machine. This enables various modes of carrying the same. Either the power unit, which is preferably rechargeable is kept in a special protective enclosure, preferably consisting of a flat box, or the calculating machine and power unit are jointly transported. It is also possible, however, to accommodate the drive motor, power source or at least connections for them in a base unit which can be placed on a table and to which the calculating machine can be connected. Finally, the calculating machine may be constructed so that it can be selectively used for manual operation, or for motor operation.

Further details and advantages of the invention will be described with reference to illustrative embodiments, the first of which shows a circular calculating machine having a permanently built-in, non-removable electric drive consisting of the drive unit with motor, brake, transmission and coupling and the power unit with a storage battery and a charging device, and provided with a barrel and calculator means in a circle around the barrel. Since calculating machines of this type are known per se, only a part of the barrel with the mainshaft of the machine has been shown. The second embodiment shows a portable attachment unit for the electric drive of a circular calculating machine whereas the third embodiment shows a table-type electric drive for a circular calculating machine of the known construction described hereinbefore. Based on the second embodiment, the fourth embodiment shows the arrangement and mode of operation of a selector which predetermines the number of revolutions of the drive motor.

In the drawing:

FIG. 2 is a horizontal transverse sectional view taken on line II—II of FIG. 1.

Figure 3:
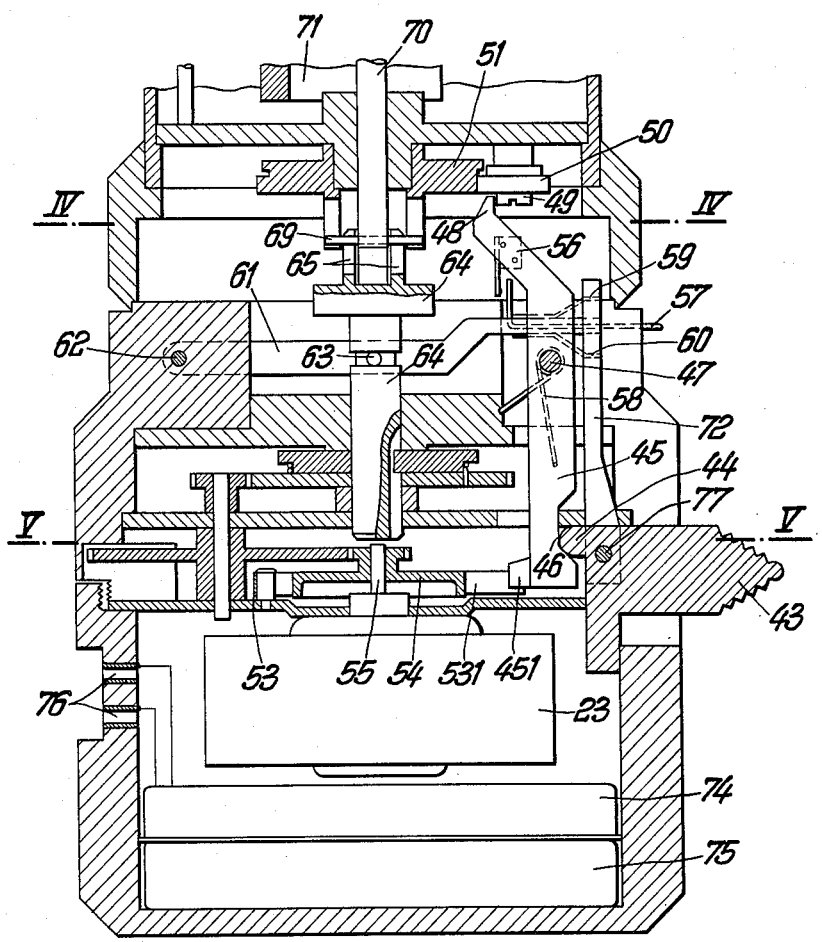
FIG. 3 shows the modified embodiment of such a drive, which enables a conversion of circular calculating machines, e.g., according to the U.S. Patents 2,525,352; 2,533,372; 2,544,426; 2,566,835; 2,588,855; and Reissue Patent 23,553 into an electrically driven calculating machine by a simple subsequent mounting of the manual calculating machine on the drive unit.
Figure 5:
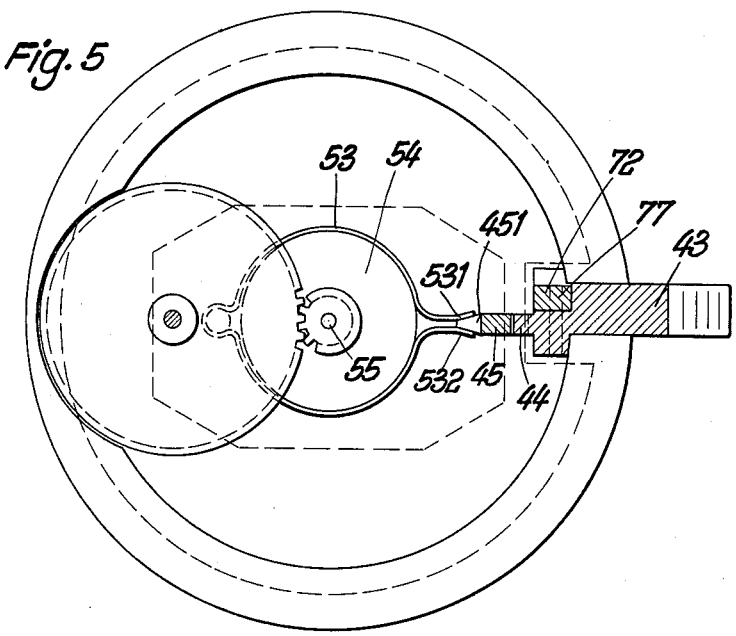

FIG. 4 corresponds to a horizontal transverse sectional view taken on line IV—IV of FIG. 3, FIG. 5 to a horizontal transverse sectional view taken on line V—V of FIG. 3.

Figures 6, 7:
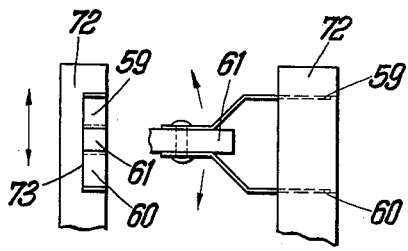

FIGS. 6 and 7 show two side views of a part of the change-over device taken in two directions differing by a right angle.

Figure 8:
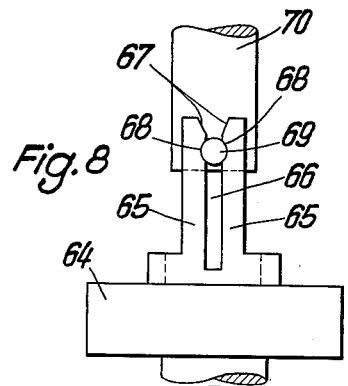
Figure 9:
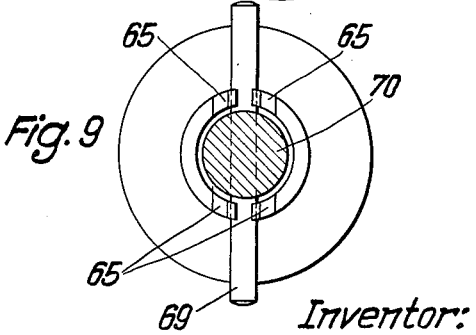

FIG. 8 is an elevation showing the coupling between the mainshaft of the transmission and the main shaft of the calculating machine whereas FIG. 9 is a corresponding plan view.

Figure 10:
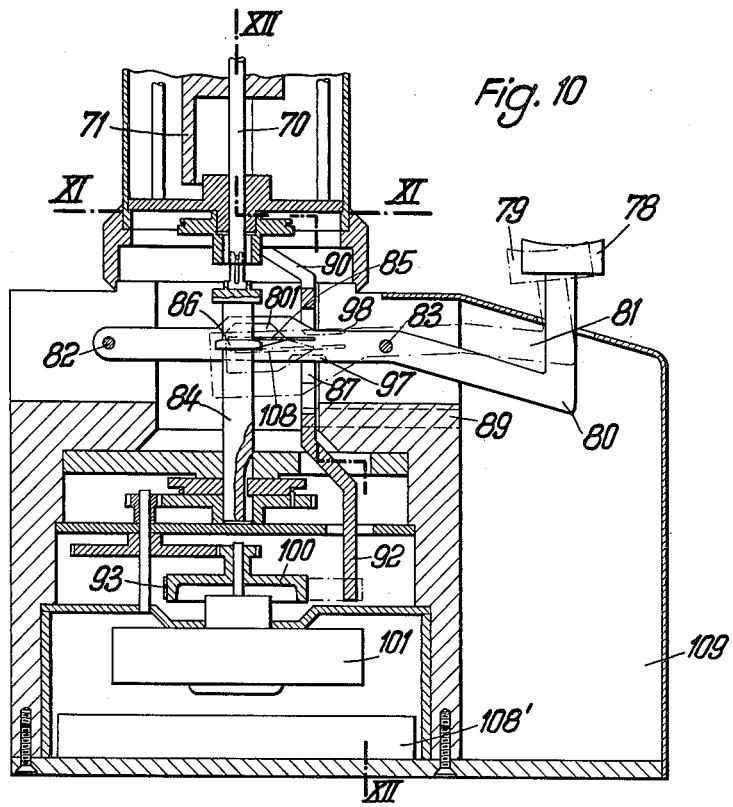

FIG. 10 is a longitudinal sectional view of an electric drive unit in the form of a base unit which can be placed on a table and supports and drives a circular calculating machine, which may also be manually operated.

Figure 11:
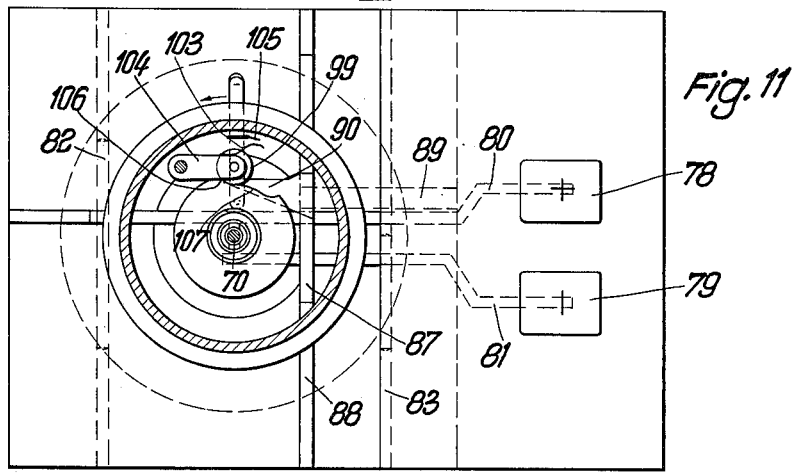
Figure 12:
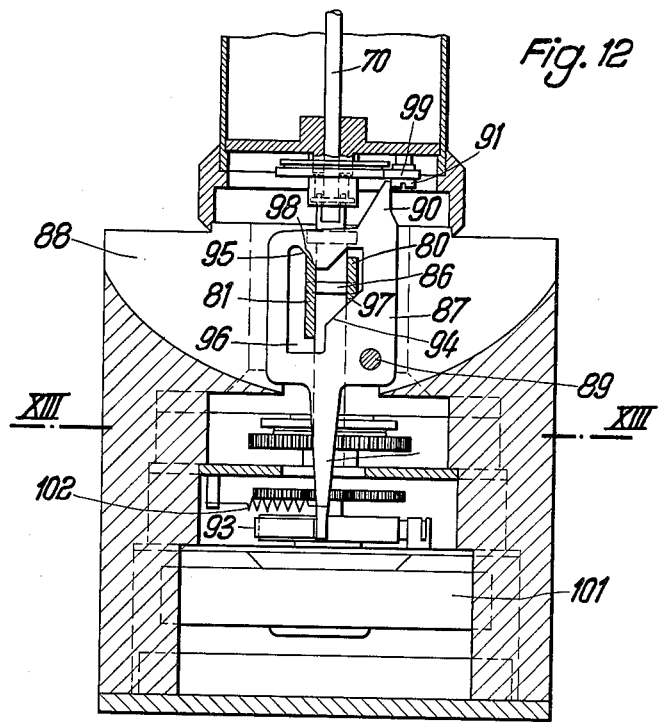
Figure 13:
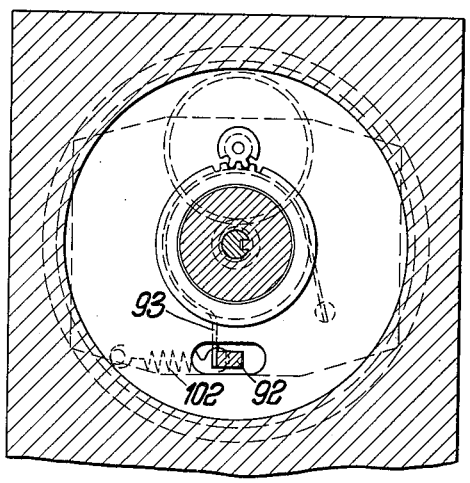
Figure 14:
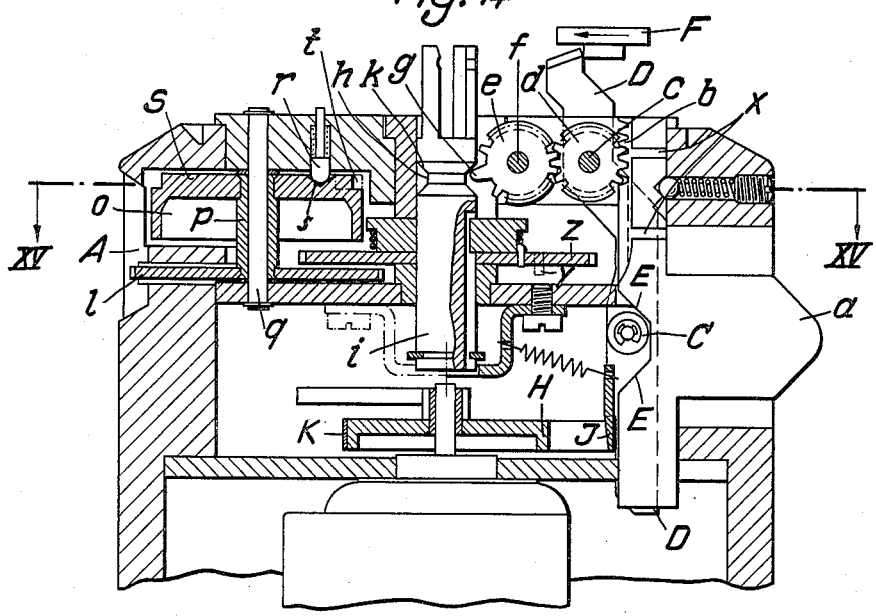
Figure 15:
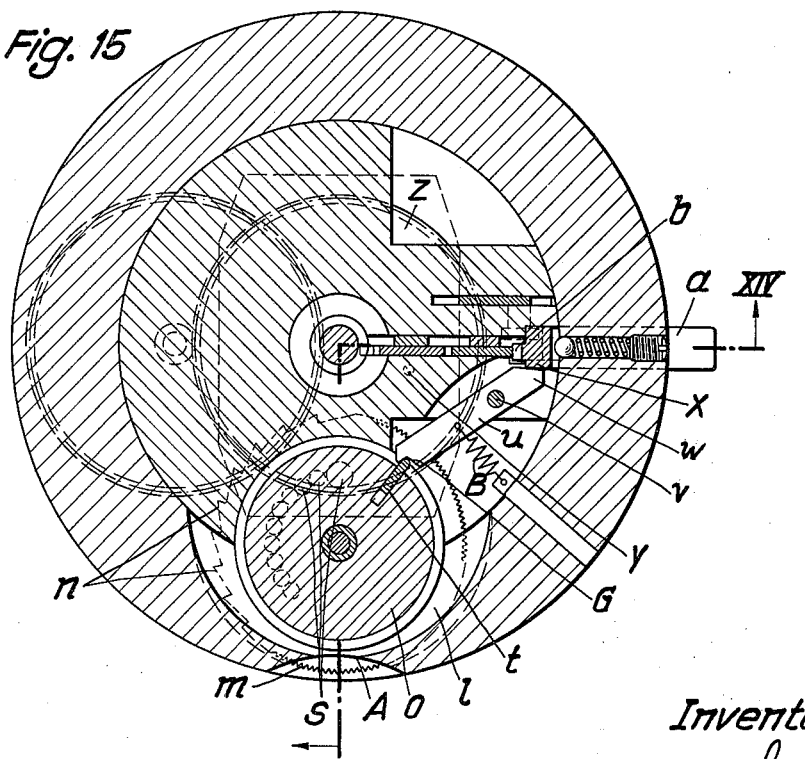

FIG. 11 is a horizontal transverse sectional view taken on line XI—XI of FIG. 10, FIG. 12 to a vertical transverse sectional view taken on line XII—XII of FIG. 11, FIG. 13 to a horizontal transverse sectional view taken on line XIII—XIII of FIG. 12, FIG. 14 is a vertical angular sectional view taken on line XIV—XIV of FIG. 15 through the base part of a circular calculating machine with a selector for the number of motor revolutions.

FIG. 15 corresponds to a horizontal transverse sectional view taken on line XV—XV of FIG. 14.

Figure 1:
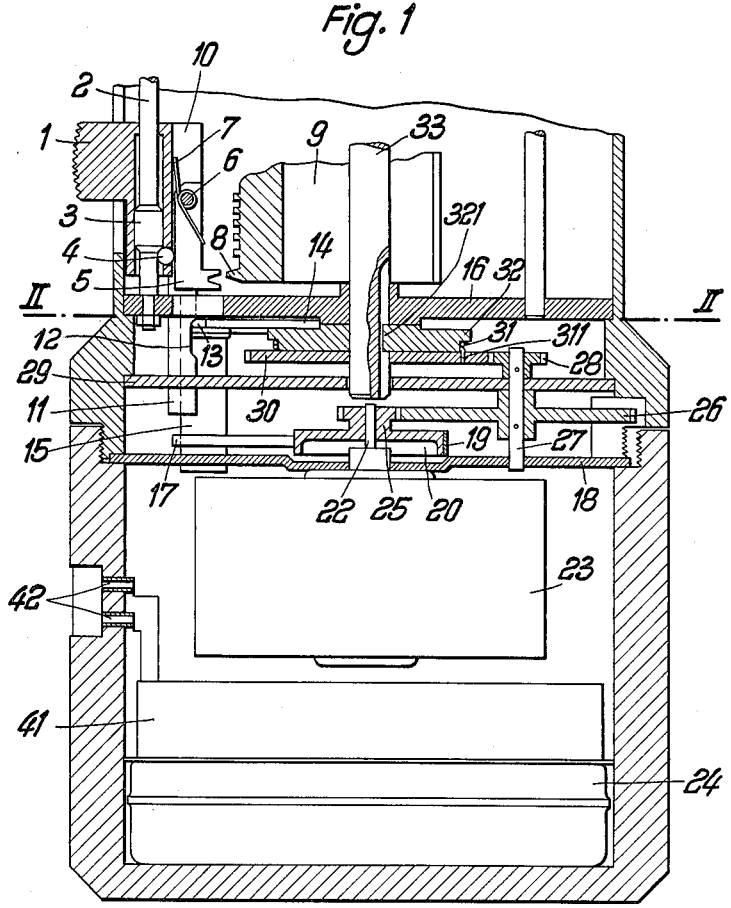
FIG. 1 is a longitudinal sectional view of an electrically driven circular calculating machine with a built-in power unit.

FIG. 16 is a top plan view, partly in section, of the calculating machine of FIG. 1 after assembly with the motor drive unit.

FIG. 17 is a diagrammatic view showing the circuit including the motor and the parts connected thereto.

In FIGS. 1 and 2, 1 is a manual switch for the electric drive of the circular calculating machine which has already been described in detail before.

The manual switch is axially slidable on the shaft 2 in both directions. The shaft 2 has a cylindrical enlargement at 3, which merges by conical transition surfaces at both ends into the shaft body 2. The conical surfaces serve as guide surfaces for a ball 4, which is movable in a horizontal direction. A fork member 5 which is pivoted on the shaft 6 is provided in the slot 10 of the manual switch and is under the influence of a spring 7, which tends to turn it in the clockwise sense. A stub shaft 11 has a notch 12, the bottom of which merges through oblique transition surfaces into the stub shaft body 11. The notch 12 receives an arm 13 of the zero buffer lever 14 (FIG. 2). Being firmly connected to the manual switch 1, the shaft stub 11 is axially displaceable. The zero buffer lever 14 and the brake cam 17 are connected to a shaft 15, which is rotatably mounted in the bearing plate 16 and in the plate bar 18. A coil spring 19 which is affixed at one end by means of the holding pin 21 to the plate bar 18 and the other end of which is wound around the brake disc 20 is prestrained to apply pressure to the periphery of the brake disc 20 and thus exerts a braking action on the motor drive shaft 22, on which the brake disc 20 is directly arranged. The electric motor 23 energized by the storage battery 24 is suspended from the plate bar 18 and drives the gear 26 by means of the pinion 25, which is integral with the brake disc 20. The gear 26 is arranged together with the gear 28 on a common shaft 27, which is rotatably mounted in the plate bars 18 and 29. The gear 28 drives the gear 30, which is freely rotatable on the mainshaft 33 of the calculating machine. The gear 30 is connected to the zero buffer disc 32 only by the end 311 of the coupling spring 31, which embraces an offset cylindrical flange of the zero buffer disc 32 and frictionally engages the same only when tightened by gear 30 rotated by motor 23. Gear 30, disk 32 and spring 31 are parts of an overrunning clutch. The zero buffer disc 32 has a wedge-shaped projection 321 interengaging with the actuator shaft 33 of the calculating machine (see also FIG. 2). When the contacts 34, 35 lying in the motor circuit contact each other they close this circuit, which is not shown. The zero buffer roller 37 is constantly urged by the spring 36 against the zero buffer disc 32. The latter has a re-entrant cam face 40, which merges through a transition face 38 into the cylindrical boundary surface of the zero buffer disc. The cam face 38 can thus urge the roller 37 and with it the zero buffer lever 14 into a position in which the contacts 34, 35 contact each other so that the motor circuit is closed and the motor revolves. On the other hand, the contacts open only in the position in which the roll 37 engages the cam face 40 so that the electric motor is de-energized only in this position of the zero buffer disc 32.

The mode of operation of the devices according to FIGS. 1 and 2 is as follows:

FIG. 1 shows the parts under consideration in the addition position of the calculating machine, in which the barrel 9 is in its lowermost position. To operate the calculating machine in the additive sense the manual switch 1 is depressed, causing also the shaft stub 11 firmly connected thereto to descend. This will urge the bevel which adjoins the top of the notch 12 against the arm 13 of the zero buffer lever to cause a rotation thereof and of the brake cam 17 in the direction opposite to the clockwise sense (see FIG. 2) because both parts are firmly connected by the shaft 15. At first, the roller 37 will lift from the cam face 38 so that the zero buffer disc 32 is released for rotation. Then the brake cam 17 will urge the free end of the brake spring 39 away in the clockwise sense around the mainshaft 33 of the machine so that the brake spring 19 lifts from the brake disc 20 to release the brake. After these two effects have been obtained, the contact spring 34 is applied against the second contact spring 35 in the last phase of motion because it follows the pivotal movement of the zero buffer lever. Thus, the motor circuit is closed and the calculating machine is started.

If the manual switch 1 remains depressed the stub shaft 11 and the notch 12 will also remain in the lower position so that the zero buffer lever 14 and the brake cam 17 cannot swing back. The freedom of movement of the zero buffer disc 32 is retained, the brake remains lifted and the contacts 34, 35 remain closed. This will result in a continuous running of the machine until the manual switch 1 is returned to its initial position. In this case the notch 12 assumes again the position shown in FIG. 1 so that the arm 13 is released for a clockwise pivotal movement about the shaft 15. The pivotal movement itself will not be effected until the zero buffer disc 32 has been sufficiently rotated to cause the roller 37 again to engage the bottom face 40 of the cam. As a result, the brake cam 17 yields before the end of the brake spring 39 so that the brake spring brakes the movement of the rotating parts. This preliminary braking retards the drive movement and the remaining kinetic energy can be completely dissipated by the running up of the roller 37 on the stop face 38.

The transmission of power from the motor shaft 22 to the actuator shaft 33 of the calculating machine has been effected during the operation of the motor by means of the pinion 25 to the spur gear 26, further by means of the shaft 27 to the spur gear 28 and further to the spur gear 30. Since the laterally bent end 311 of the coupling spring 31 was hooked into the gear 30, the coupling spring 31 has driven the zero buffer disc 32 and with it the shaft 33 along by means of the wedge 321 during the rotation of the gear 30 in the clockwise sense.

Nevertheless the calculating machine could also be operated by hand. If the actuator shaft 33 of the machine was rotated in the clockwise sense by means of the crank handle, not shown, there will be no rotation of the gear 30 which could cause a contraction of the turns of the spring 31 resulting in a firm embracing of the zero buffer disc 32. As a result, the zero buffer disc 32 will be idling during a manual operation of the mainshaft 33 of the machine and will not transmit its movement to the gear 30.

To perform subtractions the manual switch 1 is urged upwardly from the intermediate position shown in FIG. 1. This will cause the ball 4 to run up on the lower bevel of the cylindrical enlargement 3 of the shaft body 2 so that the ball will move radially inwardly and is urged on the fork member 5 causing it to swing in the counter-clockwise sense. This will force the nose 8 of the barrel 9 into the fork of the fork member 5 so that the barrel 9 will be driven to its upper position with the subsequently continued upward movement of the manual switch 1. After having been displaced along the cylindrical enlargement 3, the ball 4 is forced back under the action of the spring 7 by the top bevel of part 3 so that the fork member assumes a position in which its fork has released the nose 8 of the barrel. However, the upward movement of the manual switch 1 is not terminated at this time. As it is continued, the arm 13 comes under the action of the lower bevel of the notch 12 in the stub shaft 11 so that the aforedescribed counterclockwise pivotal movement of the zero buffer lever 14 results. This will release the zero buffer disc 32, lift the brake and finally close the contacts 34, 35 so that the motor 23 starts and performs the desired calculating operation. The motor remains again in operation as long as the manual switch 1 is urged upwardly. Upon return of the manual switch to its initial position the machine is again arrested as has been described for the addition position of the barrel.

The storage battery 24 is recharged when required by the charging device 41 by connecting the device to a power outlet by contact sockets 42.

In order to prevent a closing of the contacts 34, 35 by means of parts 33, 321, 32, 38, 37, which would cause the motor 23 to start during a manual operation of the calculating machine the insulating plate 341, which is shown in FIG. 2 and which is operable by the button 342 to slide into a peripheral slot 343 of the base rim 344, is moved during manual operation to a position in which it covers the inside boundary surface of the contact 35 so that the contact 34 cannot engage the counter-contact 35 to close the circuit even when the roller 37 is swung out in the counter-clockwise sense by the face 38. This might also be achieved by providing for a freedom of peripheral movement of the contact 35 in the base rim 344 unless it is preferred to effect such movements automatically by the manual switch 1 or by the drive crank, not shown, of the barrel 9.

A second embodiment is shown in FIGS. 3 to 9. A manual switch is again provided, which causes the automatic performance of addition operations in its lower position and the automatic performance of subtraction operations in its upper position.

The depression of the manual switch 43 causes the nose 44 thereof to run up on the lower bevel of the notch in the rocker lever 45 and imparts to the rocker lever a clockwise rotary movement about its shaft 47. This will first cause the upper nose 48 to be urged against the screw 49 of the zero buffer 50 so that the latter is lifted out of its recess as has been illustrated in FIG. 2 at 38, 40. On the other hand, this pivotal movement of the rocker lever 45 moves its nose 451 (see FIG. 3) radially inwardly so that it enters a mouth formed by the ends 531 and 532 of the brake spring 53, as is shown more clearly in FIG. 5. These ends 531, 532 are thus forced apart to release the brake disc 54 around which the brake spring extends. A continued rotation of the rocker lever 45 applies the contact 56 (seen FIG. 3) to the contact lever 57 so that the circuit of the electric motor 23 is closed. This will be the case until the manual switch 43 is returned to its initial position. Although the nose 44 moves upwardly, the rocker lever 45 under the influence of the spring 58 which has swung it in the clockwise direction remains in the position for energizing the motor, with the contact 56 and the contact lever 57 in contact with each other. Only when the zero buffer lever 50 has reached the recessed face of the zero buffer disc 51 which corresponds to the cam face 40 in FIG. 2 can the stronger zero buffer spring, not shown, overcome the spring force of the contact spring 58 so that the rocker lever 45 is urged back to its initial position. Then only are the contact 56 and the contact lever 57 opened. Further, the nose 451 of the rocker lever 45 is pulled out of the mouth 531, 532 of the spring 53 so that the latter assumes its braking position. As a result the machine will be pre-braked and the remaining kinetic energy will be completely dissipated by the runnning-up of the zero buffer roller 37 on the zero buffer stop 38 (see FIG. 2) so that the barrel remains in its zero buffer position.

Subtraction operations are performed by the calculating machine under the influence of the manual switch 43 moved to an upper position. For this purpose a transmission lever 72 is provided which follows the up and down movements of the manual switch 43. This lever 72 is shown in detail on a larger scale in FIGS. 6 and 7. It is apparent that it has a unilateral parallelepipedic recess 73, which may be formed by milling. In the neutral, intermediate position of the manual switch 43 the leaf springs 59, 60 affixed to the rocker arm 61 engage this recess 73 in such a manner that the upper leaf spring 59 just contacts the upper end face of the recess 73 and the lower leaf spring 60 just contacts the lower end face of the recess 73. The leaf springs 59, 60 are dimensioned to be capable of transmitting to the mainshaft of the calculating machine the forces which are required for the vertical movement of the barrel 71 and exerted by the transmission lever 72. An upward movement of the manual switch 43, which is firmly connected by the pin 77 to the transmission lever 72, will thus cause the transmission lever 72 to drive the rocker arm 61 by means of the spring 60 without appreciable deformation of this spring. The rocker arm 61 is firmly connected by the pin 63 (see FIG. 4) to a coupling member 64, which is shown in more detail in FIGS. 8 and 9. It is apparent that in its top part it has resilient pins 65, which form a slot 66 having a conical entrance 67 merging into a circular opening 68. When coupled to the calculating machine this resiliently yielding circular opening 68 receives the driver pin 69, which is firmly connected to the mainshaft 70 of the calculating machine. Thus the clutch is engaged simply by pushing the calculating machine on the drive unit, the driver pin 69 being pushed through the inlet 67 into the circular opening 68 in which it is held by the spring action of the pins 65. The clutch can be disengaged simply by pulling the calculating machine out of the drive unit.

As the movement of the manual switch 43 can be continued beyond the displacement required to move the barrel to its upper position, in which it engages a stop, not shown, the transmission lever 72 is connected in the resilient way shown in FIGS. 6 and 7 to the rocker arm 61, which also reaches its upper position in the upper position of the barrel. When this upward movement of the manual switch 43 is continued the leaf spring 60 will resiliently yield whereas the leaf spring 59 lifts from the top end face of the recess 73. This continued movement of the manual switch 43 is utilized for the release of the zero buffer disc 51, for lifting the brake and for closing the contacts 56, 57 in the manner which has been repeatedly explained. During these movements the nose 44 runs up on the upper bevel of the notch 46 to cause the afore-described pivotal movement of the rocker lever 45 with the individual results mentioned.

The power source consists again of a storage battery 75, which can be charged by the charging device 74. The connection for the supply system is provided at 76.

It is not essential for these embodiments, of course, that the storage battery and charging device are accommodated in the same room as the drive motors. Both parts could be kept separately, e.g., in a wrapper similar to a wallet, and be connected to the electric motor by a cable. Nor is it necessary always to carry the charging device along but this may also be a separate unit and be separately kept because it need not always be carried along.

The coupling member 64 may be connected to the drive transmission in the same manner in which the zero buffer disc 32 is connected by means of a coupling spring 31 to the gear 30 in FIGS. 1 and 2 so that a manual operation of the calculating machine is possible in conjunction with parts 341—343 (FIG. 2).

FIGS. 10-13 illustrate finally an embodiment in which the drive means are accommodated in a base unit, which can be placed on a table. This enables the use of the inherently portable calculating machine as a table-mounted calculating machine.

The single manual switch has now been replaced by separate push buttons 78, 79 for additions and subtractions. The push buttons 78, 79 serving as manual switching means are connected to key levers 80, 81, which are pivoted on shafts 82, 83. In FIG. 10 the barrel 71 is shown in the addition position, in which it engages a lower stop. The pressing of the push button 78 provided for the addition will rotate the key lever 80 about the shaft 82 so that the compensating spring 85, which serves to perform the axial displacement for setting the barrel for addition together with the collar 86 firmly connected to the change-over shaft 84, yields upwardly because the change-over shaft 84 as well as the barrel are at the lower stop so that the change-over shaft cannot perform a further downward movement. The compensating spring 85 lies in a recess 801 of the key lever 80. The collar 86 also extends through this recess. A release pawl 87 (see also FIG. 12) lies in the recess 88 and is pivotally movable about the shaft 89. Its top boundary face terminates in a nose 90, which engages the screw 91 of the zero buffer lever to urge the same away about the shaft 89 in the clockwise sense so that the zero buffer lever is lifted out of a cam recess of the zero buffer disc in the manner which has been repeatedly shown and described. The lower boundary face of the release pawl 87 terminates in a fingerlike extension 92, which lifts the brake spring 93 during a clockwise rotation about the shaft 89. The release pawl 87 has also an aperture 96 so that a lower slideway 94 and an upper slideway 95 are formed, which are engaged by the key levers 80, 81 extending through the aperture 96. Upon a depression of the addition key lever 80 its lower boundary surface 97 engaging the slideway 94 of the release pawl will cause the pawl 87 to swing in the clockwise sense. This will cause the nose 90 to lift the zero buffer 99 out of the recess 106 by means of the zero buffer screw 91 (see FIG. 11). At the same time the finger extension 92 will lift the brake spring 93 from the brake disc 100 to release the same. By the pivotal movement of the zero buffer, the contact spring 103 which is carried by the zero buffer lever 104 and included in the motor circuit is automatically urged against the contact 105 so that the motor circuit is closed and the calculating machine is started. If the addition key 78 is depressed the machine continues to run. When released, the key springs back to its original position under the action of the compensating spring 85. This eliminates the influence of the bevel 97 of the key lever 80 on the slideway 94 of the pawl 87 and the latter is released for a clockwise pivotal movement about the shaft 89 but cannot yet perform the pivotal movement because this is prevented by the tension spring 102. Only when the zero buffer roller 99 contacts the recessed surface 107 of the zero buffer disc does the contact spring 103 interrupt the motor circuit. At the same time the pivoted pawl is forced back by the zero buffer screw 91 against the action of the tension spring 102 owing to the greater force of the zero buffer spring so that the pawl 87 is swung in the counterclockwise sense. This pivotal movement results in a release of the brake spring 93. The running-up of the zero buffer roller 99 on the step 106 between the recessed face 107 and the cylindrical periphery of the zero buffer disc will arrest the drive and the calculating machine in the next following zero position of the barrel.

Actuation of the push button 79 for the performance of subtractions causes the associated key lever 81 to be pivoted around the shaft 83, the rear part of the key lever 81, accommodating the compensating spring 108, moving upwardly together with said spring. During this movement the compensating spring 108 drives the collar 86 along, which is connected to the change-over shaft 84, until it engages the stop which determines the upper position of the barrel to set the same for subtractions. After this movement the bevel 98 of the key lever 81 engages the slideway 95 of the pivoted pawl 87. The continued clockwise pivotal movement of the key lever 81 about its pivot 83 is enabled by the yielding of the compensating spring 108 although the collar 86 engages the stop and cannot continue to move upwardly. The continued movement causes by means of the surfaces 95, 98 a clockwise pivoted movement of the release pawl 87 about the shaft 89 to release again the actions described hereinbefore for the addition operation. As long as the key 79 has been depressed the machine will continue to perform subtractions. Release of the key will cause the machine to be arrested in the way which has already been described for the addition operations. The base of the machine accommodates again a storage battery and charging devices for operation independent of the supply system, or transformers and rectifiers. The transmission of power from the motor to the mainshaft 70 of the calculating machine is effected in the way which has already been illustrated in the other figures.

In FIGS. 14 and 15, $a$ is the manual switch which lies in the base part of the calculating machine in the circuit of the drive motor and which consists in its wedge-shaped top part of a rack $b$ in mesh with the gear $d$ mounted on the shaft $c$. This gear is in mesh with a gear $e$ mounted on the shaft $f$ and having a thumblike tooth $g$, which extends into a recess $h$ of a coupling shaft $i$ consisting of an extension of the mainshaft of the calculating machine and extending in the base part thereof. For this reason the coupling shaft $i$ may be considered the mainshaft of the calculating machine. An upward movement of the manual switch $a$ will cause a clockwise rotation of the gear $e$ by the gear $d$, the thumblike tooth $g$ engaging the top bevel $k$ of the recess $h$ and urging the coupling shaft $i$ of the mainshaft of the calculating machine—this mainshaft is not shown either—axially upwardly until the barrel clicks into its upper position, being driven by coupling or main shafts or otherwise. As the thumblike tooth $g$ can be moved past the upper edge of the bevel $k$ in this upper position of the coupling shaft $i$, the upward movement of the manual switch $a$ may be continued so that the initiation of the further functions of the manual switch $a$ is ensured. This continued upward movement of the manual switch $a$ does not affect the coupling shaft $i$ in any way so that it can rotate freely.

Corresponding operations take place during the shifting effected by moving the manual switch $a$ downwardly. For this reason the movement of the manual switch is transmitted by the two gears $d$ and $e$ in order to retain the usual sense of movement of circular calculating machines (lower addition position, upper subtracting position).

The periphery of a selector dial $l$ has a knurled portion $m$ and a portion provided with switch teeth $n$. It is also firmly connected by the bushing $p$ to a digit roller $o$ and the entire assembly is rotatably mounted on the shaft $q$. A spring-loaded pin $r$ has a ball-shaped end entering the recesses $s$ in dependence on the position of the digit roller $o$ and the dial $l$. The recesses $s$, the first one of which is deeper than the others and includes an angle of 90° whereas the other nine recesses are identical among themselves are shallower, including an angle of 120°, are formed in the top end face of the digit roller $o$. The latter includes also a driver $t$, by which a locking device for the manual switch $a$, which device consists of the locking pawl $u$ (FIG. 15), can be rotated about its pivot $v$. When the locking pawl $u$ has been pivotally moved its front portion $w$ lies in one of the two retaining slots $x$ provided in the manual switch $a$ so that the latter can be locked in a certain position. A pin $y$ is arranged in the gear $z$ and its protruding part is axially ground away as far as to one half. During each rotation of the gear $z$ this pin engages once a stepping tooth $n$ of the dial $l$ to rotate the same by a certain angle.

If the barrel of the calculating machine is to perform a predetermined number of revolutions, e.g., three revolutions, the dial $l$ is rotated with the finger in the clockwise sense until the digit "3" appears in the window A of the base part of the calculating machine. The knurled portion $m$ has the purpose of hindering an unintended slipping of the finger on the dial. This rotation rotates also the digit roller $o$ firmly connected to the dial $l$ so that the individual digits of the scale on its periphery will successively appear in the window A. On the other hand, the retaining pin $r$ leaves the first, deep notch and springs successively from one notch into the other. The appearance of the desired number "3" in the window A indicates that the dial has been rotated in the clockwise sense by three notches $s$ and by three stepping teeth $n$. Taking part in this clockwise rotation the driver $t$ moves away from the locking pawl $u$ so that the latter tends under the action of the tension spring B to rotate about its shaft $r$ in the counterclockwise sense but this rotation is prevented until its front portion $w$ engages the side of the manual switch $a$. A downward or upward movement of the manual switch *a* for operating the calculating machine will then cause the retaining slots *x* to take part in this movement. In the end position of the manual switch *a* (upper or lower stop of the barrel) one of the retaining slots *x* is in registry with the locking pawl *u*, independently of the upward or downward direction of movement, so that this pawl is now swung into the retaining slot *x* under the action of the tension spring B. The same upward or downward movement of the manual switch has caused the roller C connected to the release pawl D to run up on the bevel E and overcome the strong spring pressure from the zero buffer disc F and move the latter to the right when viewed as in FIG. 14. Thus, the release pawl is under a spring pressure acting in the counterclockwise sense so that the roller C is constantly urged against the bevel E in any position to which the manual switch *a* has been moved and the manual switch *a* is forced back to its operating position by the occurrence of a vertically directed component of force unless it is not retained by the locking pawl *u*. The manual switch *a* is retained as long as the front portion *w* of the locking pawl *u* is in a retaining slot *x*. In this position of the locking pawl *u* in a retaining slot *x* the motor drive of the calculating machine is in operation so that the gear *z* is also rotating at the same speed as the barrel. The pin *y* moves together with the gear *z* to engage a switching tooth *n* of the dial *l* during each revolution whereby the latter is rotated through a predetermined angle which corresponds to the pitch of the digits applied on digit rollers and of the notches. When the pin *y* is stepped for the third time on the stepping tooth *n* (in the illustrative case of the number "3" this is the last stepping) the driver *t* comes into the position in which it enters into the re-entrant portion G of the locking pawl *u* and rotates the latter in the clockwise sense about the shaft *v* out of the respective retaining slot *x* of the manual switch *a*. This releases the manual switch *a*, which springs back automatically to its initial (deenergizing) position to initiate the above-described functions for stopping the machine. This includes also the braking of the rotating parts of the machine. This braking means is seen at K, H, I. The last stepping of the pin *y* causes the locking pin *r* to enter the last, deepest retaining notch *s* which serves to hold the locking pawl *u* in its disengaged position by the driver *t* against the tension of spring B.

As is shown in FIG. 16, the circular calculating machine N has a barrel 9 having stage toothings and toothings complementary thereto and setting, transfer and counter elements arranged in a circle around the barrel. Such calculating machines having a driving crank handle O are known per se and do not form a subject matter of the present invention, which resides in providing a motor drive for such calculating machine without rendering the drive by the crank handle inoperative. For this purpose a motor drive unit has been provided, the basic construction has already been shown and described in the foregoing drawings. FIG. 16 has only the purpose of showing how such a circular calculating machine, known per se, is assembled with a motor drive unit constructed according to the foregoing figures. To this end an end disc L usually employed to close the circular calculating machine N is removed. The calculating machine is then applied to the housing 344. The mainshaft 33 of the calculating machine is coupled by a pin 69 for rotation with the zero buffer disc 32 usually provided in the calculating machine because the pin 69 enters the slot M of the zero buffer disc 32. The mounting of the calculating machine N on the housing 344 pushes the coupling piece 64 with its forks 65 (see FIG. 8) into the recess in the zero buffer disc 32, over the main shaft 33 and on the pin 69, the forks 65 clamping on the pin 69. This couples the mainshaft 33 of the calculating machine to the motor, not shown, which is accommodated in the housing 344. This coupling is not only effective in the direction of rotation but also in the axial direction so that the switch 1 can axially displace the mainshaft 33 of the calculating machine and with it the barrel to move the barrel to its addition or subtracting position.

The housing 344 has a neck 345 formed as a screw ring. By slots, one of which is shown in the sectional view, this neck is divided into segments which can resiliently yield radially to the axis of the whole assembly. The clamping jaws P of plastic are also provided. The upper part of a clamping ring Q screwed on the screw ring neck 345 merges into a cone R, the taper of which conforms to the upper portions of the clamping jaws P. Upon a downward movement of the clamping jaw ring Q caused by an appropriate rotation the internal cone R will engage the conical bearing surfaces of the clamping jaws P so that the inside surfaces thereof tightly engage the housing of the calculating machine N to retain the latter in position. In this way the calculating machine is coupled to the motor drive shaft in the peripheral and axial directions and at the same time the housing 344 of the attachment for the motor drive is frictionally connected to the calculating machine N.

FIG. 17 shows once more the circuit Z which includes the drive motor 23. The manual switch 1 is apparent, which is adjusted in the plus direction shown for addition movements and in the minus position shown for subtraction movements of the mainshaft of the calculating machine. This causes the roller S connected to the manual switch 1 to engage one of the two bevels 141, and to rotate the rocker lever 14 in the counterclockwise sense about its shaft 15. As a result, the nose 142 of the rocker lever enters between the two spaced ends 191 of the brake spring 19 to urge them further apart so that the brake disc 20, which is rigidly connected to the motor shaft, is released from the firm embrace and the motor 23 is unbraked. The movement of the manual switch 1 initiates at the same time additional functions required for the motor drive of the calculating machine. For instance, the rotary movement of the rocker lever 14 in the counterclockwise sense moves the right end of this lever upwardly to lift the nose U of the zero buffer lever T upwardly against the action of the spring V. Thus, the zero buffer lever T performs a clockwise rotation about the point W to remove the zero buffer roller 37 out of the recess 40 of the zero buffer disc 32 so that the motor starts because it need not urge the zero buffer roller 37 out of the recess 40. This pivotal movement of the zero buffer lever T urges at the same time the contact spring X against the contact Y to close the motor circuit Z. This contact spring X is firmly connected to but electrically insulated from the zero buffer lever T.

All these functions will be performed in the reverse order when the circuit breaker 1 is returned to its intermediate position and the zero buffer roller 37 having performed one rotation falls again into the recess 40 of the zero buffer disc 32.

The terminals 42 of the circuit Z are connected to the direct current connections of the charging device 41 shown in FIG. 1 to charge the accumulator 24.

What is claimed is:

1. A manually operable and motor-operable miniature calculating machine, comprising a first housing; an actuator shaft mounted in said first housing for turning movement and having one end projecting from one end of said housing; calculating means located in said first housing and operatively connected to said actuator shaft to be actuated by the same; a handle member secured to said projecting end of said actuator shaft; a second housing detachably secured to the other end of said first housing; drive means in said second housing including electric motor means, having a motor shaft, a storage battery, and circuit means connecting said motor with said storage battery and means for detachably connecting said motor shaft to said actuator shaft so that said actuator shaft can be selectively actuated by said motor and by said handle member, said calculating means being operable by said handle member when said first housing is detached from said second housing, said first housing being adapted to be carried in a pocket.

2. A manually operable and motor-operable miniature calculating machine, comprising a first housing; an actuator shaft mounted in said first housing for turning movement and having one end projecting from one end of said housing; calculating means located in said first housing and operatively connected to said actuator shaft to be actuated by the same; a handle member secured to said projecting end of said actuator shaft; a second housing detachably secured to the other end of said first housing; motor means in said second housing including a motor shaft; and overruning clutch means for detachably connecting said motor shaft to said actuator shaft so that said actuator shaft can be selectively actuated by said motor and by said handle member, said calculating means being operable by said handle member when said first housing is detached from said second housing, said first housing being adapted to be carried in a pocket, said clutch means including a first clutch member connected to said actuator shaft for rotation therewith, a second clutch member freely turnable relative to said actuator shaft and connected to said motor shaft to be turned by the same, and a spring embracing said first clutch member and having one end secured to said second clutch member so that said spring frictionally engages said first clutch member when said second clutch member is driven by said motor means but releases said first clutch member when said second clutch member is at a standstill and said actuator shaft is manually turned by said handle.

3. A manually operable and motor-operable miniature calculating machine, comprising a first housing; an actuator shaft mounted in said first housing for turning movement and having one end projecting from one end of said housing; calculating means located in said first housing and operatively connected to said actuator shaft to be actuated by the same; a handle member secured to said projecting end of said actuator shaft; a second housing detachably secured to the other end of said first housing; motor means in said second housing including a motor shaft; and overrunning clutch means for detachably connecting said motor shaft to said actuator shaft so that said actuator shaft can be selectively actuated by said motor and by said handle member, said calculating means being operable by said handle member when said first housing is detached from said second housing, said first housing being adapted to be carried in a pocket, said overrunning clutch means including a disk connected to said actuator shaft for rotation therewith, a member freely turnable on said actuator shaft and being connected to said motor shaft to be turned by the same, and a spring embracing said disc and having one end secured to said turnable member and frictionally engaging said disc when said turnable member is driven by said motor means, said spring releasing said disc when said turnable member is at a standstill and while said actuator shaft is manually turned by said handle member.

4. A manually operable and motor-operable miniature calculating machine, comprising a first housing; an actuator shaft mounted in said first housing for turning movement and having one end projecting from one end of said housing; calculating means located in said first housing and operatively connected to said actuator shaft to be actuated by the same, said actuator having a zero position in which no numbers are stored in said calculating means; a handle member secured to said projecting end of said actuator shaft; a second housing detachably secured to the other end of said first housing; motor means in said second housing including a motor shaft; control means operatively connected to said actuator shaft to assume an operative position when said actuator shaft is in said zero position, said control means being operatively connected to said motor means to effect starting and stopping of said motor means independently of the number of revolutions thereof only when said actuator shaft is in said zero position; and means for detachably connecting said motor shaft to said actuator shaft so that said actuator shaft can be selectively actuated by said motor and by said handle member, said calculating means being operable by said handle member when said first housing is detached from said second housing, said first housing being adapted to be carried in a pocket.

5. A manually operable and motor-operable miniature calculating machine, comprising a first housing; an actuator shaft mounted in said first housing for turning movement and having one end projecting from one end of said housing; calculating means located in said first housing and operatively connected to said actuator shaft to be actuated by the same, said actuator shaft having a zero position in which no numbers are stored in said calculating means; a handle member secured to said projecting end of said actuator shaft; a second housing detachably secured to the other end of said first housing; motor means in said second housing including a motor shaft; circuit means connected to said motor means and including a main switch and a control contact; and control means operatively connected to said actuator shaft and controlled by the same to assume an operative position when said actuator shaft is in said zero position, said control means in said operative position closing said control contact so that said motor means can be energized by operation of said main switch only when said actuator shaft is in said zero position; and means for detachably connecting said motor shaft to said actuator shaft so that said actuator shaft can be selectively actuated by said motor and by said handle member, said calculating means being operable by said handle member when said first housing is detached from said second housing.

6. A manually operable and motor-operable miniature calculating machine, comprising a first housing; an actuator shaft mounted in said first housing for turning movement and having one end projecting from one end of said housing; calculating means located in said first housing and operatively connected to said actuator shaft to be actuated by the same, said actuator shaft having a zero position in which no numbers are stored in said calculating means; a handle member secured to said projecting end of said actuator shaft; a second housing detachably secured to the other end of said first housing; motor means in said second housing including a motor shaft; a brake means having an inoperative position, and a braking position for braking said motor means; control means operatively connected to said actuator shaft to assume an operative position when said actuator shaft is in said zero position, said control means being operatively connected to said motor means to effect starting and stopping of said motor means independently of the number of revolutions thereof only when said actuator shaft is in said zero position, and being operatively connected to said brake means for moving the same to said braking position shortly before said motor means is stopped when said actuator shaft is in said zero position; and means for detachably connecting said motor shaft to said actuator shaft so that said actuator shaft can be selectively actuated by said motor and by said handle member, said calculating means being operable by said handle member when said first housing is detached from said second housing.

7. A manually operable and motor-operable miniature calculating machine, comprising a first housing; an actuator shaft mounted in said first housing for turning movement and having one end projecting from one end of said housing; calculating means located in said first housing and operatively connected to said actuator shaft to be actuated by the same, said actuator shaft having a zero position in which no numbers are stored in said calculating means; a handle member secured to said projecting end of said actuator shaft; a second housing detachably secured to the other end of said first housing; an electric motor in said second housing, and a motor shaft driven by said electric motor; circuit means connected to said electric motor and adapted to be connected to a source of power, said circuit means including a main switch and control contact means for completing and interrupting the circuit of said electric motor; locking means in said first housing for locking said actuator shaft in said zero position; brake means for braking said motor shaft; control means operatively connected to said actuator shaft and controlled by the same, said control means being operatively connected to said locking means to effect release of said actuator shaft and operatively connected to said brake means to effect release of the same when said main switch is closed, said control means being operatively connected to said control contact means to close the same to effect start of the motor after release of said locking means and brake means so that said locking means, brake means and control contact means are actuated in a predetermined sequence, said sequence being reversed when said main switch is opened; and means for detachably connecting said motor shaft to said actuator shaft so that said actuator shaft can be selectively actuated by said motor and by said handle member, said calculating means being operable by said handle member when said first housing is detached from said second housing.

8. A miniature calculating machine as set forth in claim 7 and comprising a storage battery in said second housing connected into said circuit means of said motor; and charging means connected to said storage battery and adapted to be connected to a source of electric power.

9. A miniature calculating machine as set forth in claim 7 and including a barrel mounted on said actuator shaft non-turnable and for axial movement between a first position in which said actuator shaft actuates said calculating means through said barrel to perform additions and a second position in which said actuator shaft actuates said calculating means through said barrel to perform subtractions; and including means connecting said main switch with said barrel, said main switch having an inoperative central position and two end positions for closing said circuit means, said barrel being shifted by said main switch to assume said first and second positions when said main switch is in said end positions, respectively.

10. A miniature calculating machine as set forth in claim 7 wherein said control means include a cam disk connected to said actuator shaft for rotation, and a cam follower cooperating with said cam disk and connected to said control contact means for opening and closing the same; said brake means including a brake member connected to said cam follower for movement with the same, said cam follower and said brake member being operatively connected to said main switch to be moved by the same when the same is actuated.

11. A miniature calculating machine as set forth in claim 10 wherein said brake means include a brake disk connected to said motor shaft and a brake spring embracing said brake disk and being operated by said brake member.

12. A miniature calculating machine as set forth in claim 5 and including a barrel mounted on said actuator shaft non-turnable and for axial movement between a first position in which said actuator shaft actuates said calculating means through said barrel to perform additions and a second position in which said actuator shaft actuates said calculating means through said barrel to perform subtractions; and including means connecting said main switch with said barrel, said main switch having an inoperative central position and two end positions for closing said circuit means, said barrel being shifted by said main switch to assume said first and second positions when said main switch is in said end positions, respectively.

13. A manually operable or motor operable calculating machine, comprising calculator means; manually operable actuator shaft means connected to said calculator means for operating the same and having a zero position in which no numbers are stored in said calculator means; motor means; control means operably connected to said actuator shaft means to assume an operative position when said actuator shaft means is in said zero position, said control means being operatively connected to said motor means for permitting starting and stopping of said motor means only when said actuator shaft means is in said zero position; and means for detachably coupling said motor means with said actuator shaft means so that the latter can be selectively actuated by said motor means or by manual operation.

14. A manually operable or motor operable calculating machine, comprising a first housing, calculator means located in said first housing; manually operable actuator shaft means connected to said calculator means for operating the same and having a zero position in which no numbers are stored in said calculator means; a second housing detachably secured to said first housing; motor means in said second housing; control means operably connected to said actuator shaft means to assume an operative position when said actuator shaft means is in said zero position, said control means being operatively connected to said motor means for permitting starting and stopping of said motor means only when said actuator shaft means is in said zero position; and means for detachably attaching said first and second housing to each other, and for detachably coupling said motor means with said actuator means so that the latter can be selectively actuated by said motor means or by manual operation.

15. A manually operable or motor operable calculating machine, comprising calculator means; manually operated actuator shaft means connected to said calculator means for operating the same and having a zero position in which no numbers are stored in said calculator means; motor means; circuit means connected to said motor means and including a main switch and a control contact; and control means operatively connected to said actuator shaft means and controlled by the same to assume an operative position when said actuator shaft means is in said zero position, said control means in said operative position closing said control contact so that said motor means can be energized by operation of said main switch only when said actuator shaft means is in said zero position; and means for detachably coupling said motor means with said actuator shaft means so that the latter can be selectively actuated by said motor or by manual operation.

16. A manually operable and motor operable miniature calculating machine comprising a first housing; calculator means located in said first housing; manually operated actuator means connected to said calculator means for operating the same and including an actuator shaft having one end projecting from one end of said first housing, and a handle connected to said actuator shaft; a second housing; motor means in said second housing including a motor shaft having a coupling portion located at one end of said second housing; a circular projection secured to said one end of one of said housings; a collar secured to said one end of the other housing and having an inner circular surface matching and surrounding said circular projection; and means for detachably securing said collar to said projection whereby said first and second housings are detachably attached to each other, said projecting end of said actuator shaft and said coupling portion of said motor shaft being detachably coupled to each other so that said calculator means can be driven by said motor means whereas upon separation of said first and second housings, said calculating means is manually operable.

17. A manually operable and motor operable miniature calculating machine comprising a first housing; calculator means located in said first housing; manually operated actuator means connected to said calculator means for operating the same and including an actuator shaft having one end projecting from one end of said first housing, and a handle connected to said actuator shaft; a second housing; motor means in said second housing including a motor shaft having a coupling portion located at one end of said second housing; a circular projection secured to said one end of one of said housings; a resilient collar secured to said one end of the other housing and having an inner circular surface matching and surrounding said circular projection, and an outer circular surface including a threaded portion and a conical portion; and an annular clamping member having a threaded surface engaging said threaded portion and a conical surface engaging said conical portion so that turning of said clamping member results in tight engagement between said circular projection and said resilient collar whereby said first and second housings are detachably attached to each other, said projecting end of said actuator shaft and said coupling portion of said motor shaft being detachably coupled to each other so that said calculator means can be driven by said motor means whereas upon separation of said first and second housings, said calculating means is manually operable.

References Cited in the file of this patent

UNITED STATES PATENTS

| Number | Name | Date |
|---|---|---|
| 1,781,689 | Horton | Nov. 18, 1930 |
| 1,851,267 | Wheelbarger | Mar. 29, 1932 |
| 1,902,598 | Turck | Mar. 21, 1933 |
| 2,661,155 | Mark | Dec. 1, 1953 |
| 2,695,134 | Sundstrand | Nov. 23, 1954 |